H. A. HARRINGTON.
ELECTRICAL GENERATING SYSTEM.
APPLICATION FILED JAN. 10, 1920.
1,423,107.
Patented July 18, 1922.
2 SHEETS—SHEET 1.
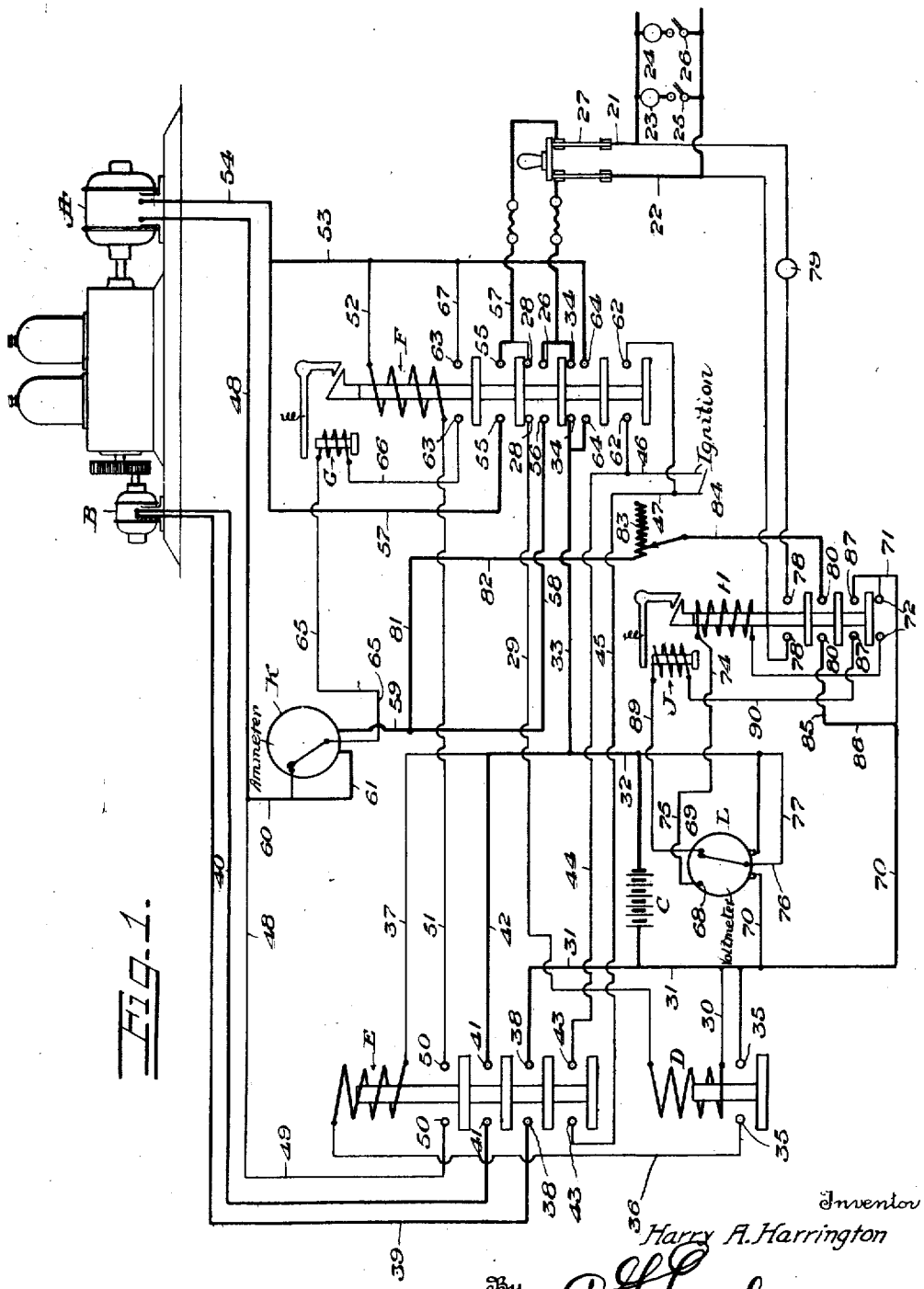

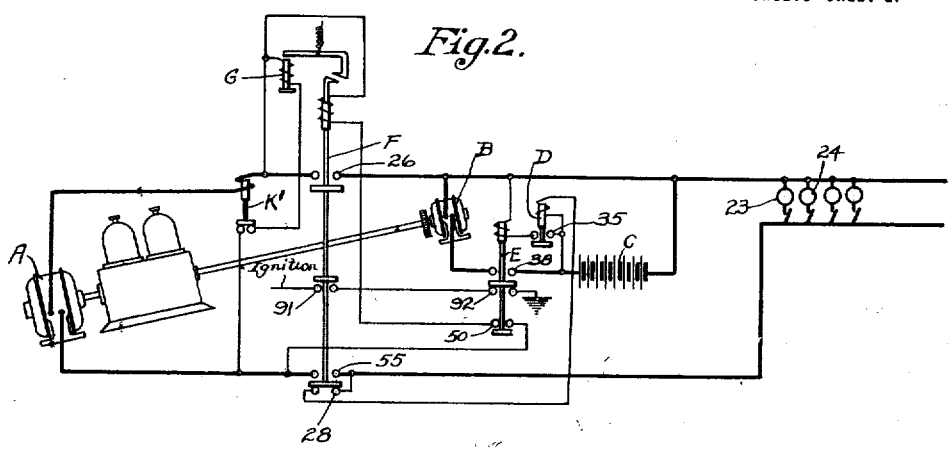
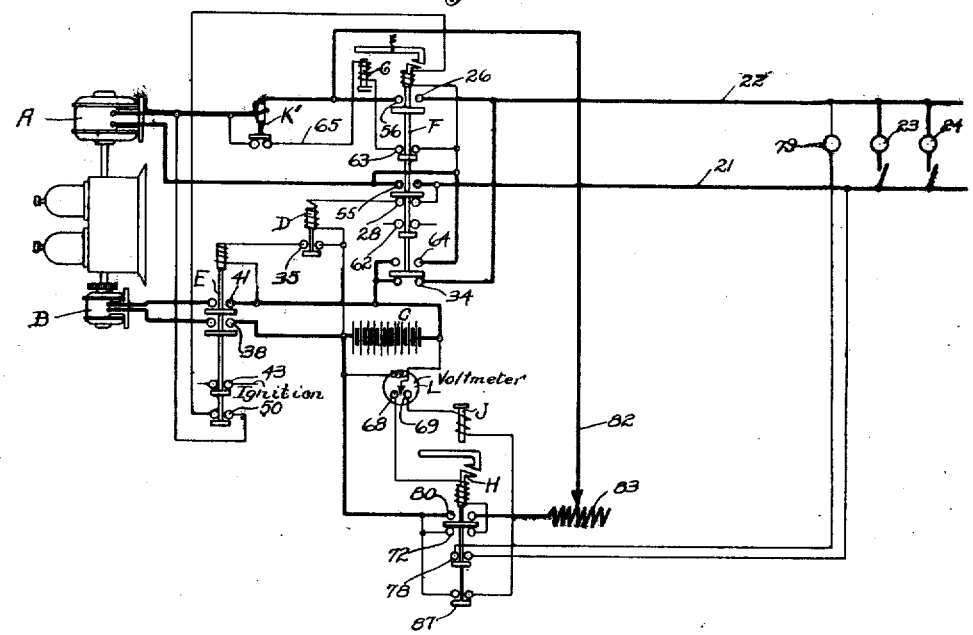

UNITED STATES PATENT OFFICE.

HARRY A. HARRINGTON, OF CUYAHOGA FALLS, OHIO.

ELECTRICAL GENERATING SYSTEM.

1,423,107.  Specification of Letters Patent.  Patented July 18, 1922.

Application filed January 10, 1920. Serial No. 350,641.

*To all whom it may concern:*

Be it known that I, HARRY A. HARRINGTON, a citizen of the United States, and resident of Cuyahoga Falls, Ohio, have invented new and useful Improvements in Electrical Generating Systems, of which the following is a specification.

My invention relates to an automatic electric generating system of the kind in which the prime mover is an internal combustion engine driving a generator which supplies current to lamps or other current-consuming devices.

My invention is particularly useful in isolated lighting plants especially in the rural districts where the attendant is unskilled in the care and maintenance of storage batteries.

The novelty of my invention lies in the fact that it is a departure from the two general systems of isolated power plants commonly met. One of these systems provides a low voltage storage battery (32 or 64 volts) to supply current to the main conductors when the engine is not running, this battery being also utilized to furnish energy to operate the generator as a motor and start the engine. The other system uses no storage batteries whatever, and comprises an engine and a generator, and requires that the engine be started manually.

The main object of my invention is to provide an isolated electric generating plant which furnishes current at the standard commercial voltage, generally 110 or 115 volts, and which eliminates the necessity of using a storage battery to supply current at this voltage.

This permits the operator of such a plant to use standard lamps, motors, or other current-consuming devices. It promotes economy in wiring due to the ability to use smaller conductors at standard voltages than would be possible with a low voltage system transmitting the same amount of power. For the same reason it increases the economical range of transmission of current. Also this system allows the installation of such a plant in places where fumes from the cells of the ordinary low voltage battery system would be objectionable.

Another object is to provide means for automatically starting the engine when a lamp or other current-translating device is connected to the main conductors, and to automatically stop the engine when the current-consuming devices are disconnected from the mains. This results in economy of operation in that the engine does not run when no current is required.

Other objects and advantages of my invention will be apparent from the following detailed description when taken in connection with the accompanying drawings in which Figure 1 is a diagrammatic illustration of an electrical generating system embodying my invention; Fig. 2 is a diagrammatic showing of the system without the battery-charging devices; and Fig. 3 diagrammatically shows a modification of the system.

Referring to Fig. 1 of the drawings, I show at "A" a generator driven by an internal combustion engine. "B" is a low voltage motor, preferably 6 or 12 volts, suitably connected to the internal-combustion engine to act as a cranking or starting medium for this engine. "C" is a low voltage battery, preferably a storage battery of 6 or 12 volts such as is used for automobile starting, lighting, and ignition. This battery furnishes current to energize motor "B" and to certain relays as hereinafter shown. "D" is a sensitive relay, energized from the battery "C" and operating to close the circuit to magnet "E".

Altho, diagrammatically, the magnets in this invention are shown as solenoids with plungers carrying disc contact connectors, I do not wish to confine my invention to this type of apparatus, and it is understood that the terms solenoid and plunger are used interchangably with the terms magnet and armature respectively. It is to be further understood that when the magnets are energized, the connector discs make connections with the contact studs shown immediately above them and that normally these discs make contact as shown in diagram.

"E" is a magnet energized from battery "C" though the medium of relay "D". "E" has an armature provided with a plurality of contact-making members which perform certain functions to be described later.

"F" is a magnet energized from the generator "A" and so designed as not to attract its armature until the voltage of the generator has reached a certain value which may be 75 or 80% of normal. The armature carries a plurality of contact-making members which perform functions which will be explained. This magnet is so arranged that when its armature is attracted and reaches its limit of travel, it will be retained in this position by a latching arrangement.

"G" is a small magnet energized by current from generator "A" and so disposed with regard to the latching mechanism of magnet "F," that the armature of magnet "F" is released when magnet "G" is energized. This allows armature of magnet "F" to return to normal position.

"H" is a magnet energized from the battery "C" and has an armature carrying a plurality of contact-making members. This magnet is provided with a latching arrangement similar to that of magnet "F."

"J" is a magnet energized from the battery "C." Its function is to release the latching mechanism of magnet "H" when magnet "J" is energized.

"K" is a contact-making ammeter whose needle is arranged to make contact with a stationary member when no current is flowing through the ammeter circuit. The needle carries current which energizes magnet "G" and if this current is excessive, an auxiliary relay may be inserted in the circuit in such a manner that the needle makes contact for this auxiliary relay which in turn closes the circuit for magnet "G."

"L" is a relay of the voltmeter type, having two stationary contacts as shown. The needle of this relay makes connection with these contacts when the voltage of the battery "C" falls or rises to certain values.

Having thus described the major members of my invention, I will point out in detail the connections and functions of the component devices so that the operation of the system may be clearly understood.

Referring to the diagram, all members of this invention are shown in their normal conditions. The engine and generator are at rest and it is assumed that the battery "C" is fully charged, while the main conductors have an open circuit. Using numerals for reference, 23 and 24 may be any current-consuming devices, in this case they are shown as lamps. Assume that lamp 23 is connected to the main circuit 21 and 22 by closing of the switch 25.

A circuit may then be traced from lamp 23 through conductor 21, main switch 27, contact members 28, conductor 29, winding of relay "D," conductors 30 and 31 to battery "C," thence through conductors 32 and 33, contact members 34, conductor 22, switch 25 to lamp 23. This causes relay "D" to be energized, attract its armature and close its contacts. Current then flows from battery "C" through conductor 31, contacts 35 of relay "D," conductor 36, winding of magnet "E," conductor 37, conductor 32 to battery "C." Hence magnet "E" is energized attracting its armature causing its contact members to function. The following circuits may then be traced:

One circuit starts at battery "C," proceeds through conductor 31, through contacts 38, conductor 39, motor "B," conductor 40, contacts 41, conductors 42 and 32 to battery "C." The starting motor "B" is energized, rotates and causes the internal-combustion engine to revolve.

Contacts 43 close the circuit of an induction coil or magneto in an ignition system of any suitable type, through the conductors 44, 45, 46, and 47. The specific form of ignition system employed is not material to my invention and therefor it is deemed necessary to illustrate only a master switch for controlling an ignition circuit of any suitable type. With the engine revolving and the ignition circuit operative, an explosive charge will be drawn into the cylinder or cylinders of the engine and will be exploded, causing the production of power and self-continued rotation. When the engine attains speed, the motor "B" will run idle.

A third circuit may be traced from generator "A" through conductors 48 and 49, contacts 50 of magnet "E," conductor 51, winding of magnet "F," conductors 52, 53 and 54 to generator "A."

When the voltage of generator "A" attains a value of 75 or 80%, relay "F" is energized, causing its armature to be attracted and latched in place. Up to this time no current is flowing through the ammeter "K," but as soon as magnet "F" is energized, the main circuit 21 and 22 is switched from the lower contacts 28 and 34 to the upper contacts 55 and 56. Hence current may be traced from generator "A" through conductors 48, 60 and 61, through ammeter "K" to conductors 59 and 58, through contacts 56, main switch 27, conductor 22, switch 25, lamp 23, conductor 21, switch 27, contacts 55, conductors 57 and 54 to generator "A."

The breaking of connections at contacts 28 and 34 of magnet "F" opens the circuit to relay "D," causing the latter to be de-energized. In turn it breaks the circuit to magnet "E" whose armature returns to normal. Breaking of contact connections at magnet "E" results as follows:

The circuit of magnet "F" is broken at contacts 50, but armature of "F" is held in by the latch. Contacts 38 and 41 break connections to starting motor "B" causing it to run idle; connection to the ignition circuit is broken at contacts 43 of magnet "E," but is maintained by contacts 62 of magnet "F" since these contacts are connected in multiple by conductors 44, 45, 46 and 47.

When magnet "F" is energized, it provides for the circuit to magnet "G" by means of its contacts 63. This circuit will be traced when the operation of stopping the engine is explained. The circuit to magnet "G," it will be noted, is opened in ammeter "K" by the needle contact when current flows through the ammeter. To prevent magnet "G" from getting a momentary impulse of current during the movement of the armature of magnet "F" from its normal position, contacts 63 of magnet "F" may be designed to close after contacts 55 and 56 have been made, or as an alternative, magnet "G" may be provided with a dash-pot or other means to render it sluggish in action. Magnet "F" also is provided with contacts 64 which are closed when this magnet is energized. These contacts are made to afford means for the control of the charging of the battery "C." The operations which take place in the charging of this battery will be explained later.

At this point, the engine having attained full speed, the generator "A" will generate normal voltage and the lamp 23 or any other connected current-consuming devices will receive requisite current.

No current at this time is flowing from battery "C" because this is employed to furnish current for the control of the starting devices only, and these devices, namely; the relay "D," magnet "E" and motor "B" are all on open circuits.

Also, magnets "F" and "G" are consuming no current since their circuits are open. Hence it will be seen that with the exception of a slight amount of current necessary at times for the charging of battery "C," the full output of generator "A" is available for the production of light or power.

The operation of stopping the engine is as follows:

Disconnection of the last current-consuming device (in this case assumed to be a lamp 23) from the main conductors 21 and 22, causes the needle of the ammeter "K" to fall back and make connection with the stationary contact. This allows current to flow from generator "A" along conductors 48 and 60 to contact and needle of ammeter "K," conductor 65, through winding of magnet "G," conductor 66, contacts 63, conductors 67, 53 and 54 to generator "A." This energizes magnet "G" causing it to release the latch mechanism of magnet "F" and allows the armature of the latter to return to normal position. The circuit to magnet "G" is now broken at contacts 63, the main circuit is switched from contacts 55 and 56, to contacts 28 and 34. The charging circuit to battery "C" is broken at contacts 64 and the ignition circuit is opened at contacts 62, thus causing the internal-combustion engine to stop, and the generator "A" to cease generating.

Hence it will be seen that all mechanism and circuits are again in the normal condition previous to, and necessary for, the starting of the engine.

It has been assumed that battery "C" is a storage battery, hence means should be provided for keeping it properly charged. To effect this purpose, the voltmeter relay "L" is provided, and is connected across the terminals of the storage battery "C." Contacts 68 and 69 of this relay are so arranged that the voltmeter needle will make contact with them at the low and high values respectively which the voltage of the battery is allowed to attain. When the battery becomes discharged to a point where its voltage reaches a certain minimum value, the needle of the voltmeter relay "L" makes contact at 68. A circuit may now be traced from battery "C," conductors 31, 70 and 71, contact 72 of magnet "H", winding of magnet "H," conductors 74 and 75, contact 68, needle relay "L," conductors 76, 77 and 32 to battery "C." This energizes magnet "H", causing its armature to be attracted and to be latched in position.

Magnet "H" now consumes no current because it has opened its own circuit at contacts 72. If the engine is not running and if, for some reason, the voltage of battery should fall to the minimum allowable value, contacts 78 are provided to connect a resistance across the main circuit 21 and 22, causing the automatic starting of the engine in like manner as when lamp 23 was connected. This resistance may take the form of a lamp as shown by numeral 79.

Contacts 64 and 80 are provided to complete the charging circuit which may be traced as follows; from generator "A", which is assumed to be operating, along conductors 48, 60 and 61, through ammeter "K" to conductors 59, 81 and 82, variable resistance 83, conductor 84, contacts 80, conductors 85, 86, 70 and 31 to battery "C," thence to conductors 32 and 33, contacts 64 of magnet "F," conductors 53 and 54 to generator "A."

The battery "C" continues to charge and this operation does not interfere with the operation of any current-consuming devices which may be connected across the main circuit. When the battery voltage attains the proper maximum value, the needle of relay "L" will make contact with point 69 and the following circuit is established. From battery "C," through conductors 32, 77, and 76, then through needle to contact 69, thence through conductor 89, through winding of magnet "J," conductor 90, contacts 87, conductors 71, 70 and 31 to battery "C." This energizes magnet "J" causing it to release latch of magnet "H" whose armature falls to normal position. Magnet "J" is then deenergized by breaking of contacts 87. The resistance 79 is also disconnected from the main circuit at contacts 78, and if nothing else is connected to these mains, the operation of stopping the engine will proceed as previously described.

Hence it will be noted that means have been provided for charging battery "C" regardless of whether the engine is running or not at the time it is desired that the charge shall begin. Also, magnets "J" and "H" consume current only momentarily. It is impossible to throw the battery across the generator "A," when same is idle, and thereby discharge the battery or cause reversal of the generator fields, because contacts 64 of magnet "F" must be closed and this is possible only when the generator "A" is generating.

Attention is now invited to Figure 2 of the drawings which schematically shows a modified form of my invention without the battery-charging portion of the system. The various switches, apparatus, etc. are numbered in accordance with the previously described system shown in Fig. 1.

In this Figure, only a conventional showing of the main switch-latching device is believed necessary. The starting switch E is shown for convenience as having only one main circuit contactor and a single interlock to control the energizing circuit for the main switch F.

A current relay K' is shown in lieu of the ammeter K and is assumed to function in the same manner as the ammeter.

The ignition system, which is conventionally indicated, may be of any type in which the grounding of the circuit through series-connected contactors 91 and 92 interrupts the operation of the prime mover.

Only a brief discription of the operation of this modified system is deemed necessary. When a circuit is established through any of the current consuming devices, the relay D is energized from the battery C through the interlock 28 of the main switch F. Relay D establishes an energizing circuit for the starting switch E and thus connects the starting motor B to the battery C. The closing of switch E renders the ignition circuit active and thus effects the starting of the prime mover.

The switch E, when closed, completes the energizing circuit for the main line switch F which is actuated when a sufficient voltage is developed by the generator A as previously explained. The switch F, however, being mechanically latched when once closed, is independent of the subsequent operation of switch E which is deenergized by the interruption of the circuit through interlock 28.

The relay K' is held suspended over the contact members so long as current traverses the main circuit. When the main circuit is interrupted, however, relay K' energizes the latching device G to thus interrupt the operation of the system.

Figure 3 shows a system with a ground ignition circuit and provided with a battery charging outfit. A description of the operation of this system is not deemed necessary in view of the description of the operation of the systems previously set forth.

It will be clear from the foregoing description that an isolated lighting plant constructed substantially in accordance with my invention as described and illustrated, will cause the engine to automatically start and drive a generator to provide current for light and power, when a lamp or other current-consuming device is connected across the main conductors; and will automatically stop the engine when current is no longer required and the last current-consuming device is disconnected. It will also be seen that this is accomplished without using the generator as a motor and without employing a storage battery which is connected in the main distributing circuit. The proper charging of the battery is, moreover, accurately regulated, thus prolonging its life and insuring reliability of service.

It will be further noted that a small low-voltage battery, is all that is required for starting purposes. An examination of the systems illustrated discloses the fact that the majority of contacts are broken when little or no current is flowing and hence, contact trouble is reduced to a minimum. An incidental feature, advantageous to this system, is the fact that the blowing of a main fuse will automatically stop the engine which is excellent in case of a serious short circuit.

What I claim is:

1. An electrical generating system including, in combination, a prime-mover; a starting-device for the prime-mover; a generating-device driven by the prime-mover; associated means for storing and supplying electricity; conductors connecting these devices and constituting circuits therewith; a secondary circuit; a main current-consuming circuit associated with these circuits; means operable upon the closing of the main circuit for starting the prime-mover, said means including a magnetic device provided with contacts; terminals forming circuits connected with the main circuit and energized upon closing of the main circuit to close the contacts of the secondary circuit; a second magnetic device including an armature in circuit with the first magnetic device and operable upon the closing of the circuit to attract its armature; means included in the circuit of the second magnetic device for normally holding the armature in attracted position; and another circuit associated with the second magnetic device and operable upon closure thereof to release the armature-holding means.

2. An electrical generating system including, in combination, a prime-mover; a starting-device for the prime-mover; a generating-device driven by the prime-mover; associated means for storing and supplying electricity; conductors connecting these devices and constituting circuits therewith; a secondary circuit; a main current-consuming circuit associated with these circuits; means operable upon the closing of the main circuit for starting the prime-mover, said means including a magnetic-device provided with an armature and contacts and terminals forming circuits connected with the main current and energized upon closing of the main circuit to close the contacts of the secondary circuit; a second magnetic-device in circuit with the first magnetic-device and operable upon the closing of the circuit to attract its armature; means included in the circuit of the second magnetic-device for normally holding the armature in attracted position; another circuit associated with the second magnetic-device and operable upon closure thereof to release the armature-holding means; and a current measuring device disposed in one of the circuits and operable to actuate the releasing-device.

3. In an electrical generating system, the combination with an electrical generator; a battery; a prime mover; an electrical motor for starting the prime mover; and a main distributing circuit including current consuming devices; of a system of control for the apparatus comprising a main circuit switch having an actuating coil, an auxiliary switch for controlling the starting motor, means associated with the auxiliary switch for completing the circuit for the actuating coil of the main switch, a latch for mechanically latching the main switch in its closed position, and an electro-magnetic device for releasing said main circuit switch when no current is traversing the distributing circuit.

4. In an electrical generating system, the combination with an electrical generator; a battery; a prime mover; an electrical motor for starting the prime mover; and a main distributing circuit including current consuming devices; of a system of control for the apparatus comprising a main circuit switch, an auxiliary switch for controlling the starting motor, an interlock associated with the auxiliary switch for interrupting the actuating circuit of the main switch when said auxiliary switch is deenergized, mechanical latching means for maintaining said main switch closed when once operated, and electro-magnetic means energized only when less than a predetermined small value of current traverses the distributing circuit for releasing said latching means.

5. In an electrical generating system, the combination with an electrical generator; a battery; a prime mover; an electrical motor for starting the prime mover; and a main distributing system including current consuming devices; of a sytem of control for the apparatus comprising a main circuit switch, an auxiliary switch for controlling the starting motor, a mechanical device for latching said main circuit switch in its closed position, electro-magnetic means controlled by the current traversing the distributing circuit for releasing the latching device, and means associated with the auxiliary switch for interrupting the actuating circuit of the main switch when said auxiliary switch is open.

6. In an electrical generating system, the combination with a generator; a distributing circuit including current consuming devices; a prime mover; a motor for starting said prime mover; and a storage battery; of a main circuit switch having a plurality of interlocks, a mechanical latch for maintaining said main circuit switch closed when initially actuated, an electro-magnetic device for releasing said latching means, a relay actuated by less than a predetermined small value of current traversing the distributing circuit for controlling the electro-magnetic device, an auxiliary switch having an actuating coil for controlling the starting motor, a relay for controlling the energization of the actuating coil of the auxiliary switch, said relay being energized through the current consuming devices and interlocked with said main circuit switch and operable only when said main circuit switch is open, and an interlock actuated by the auxiliary switch for preventing the operation of the main switch except when said auxiliary switch is closed.

7. An electrical generating system comprising a generator; a prime mover adapted to drive the generator; a source of electrical storage and supply; a main distributing circuit associated therewith including current consuming devices; control circuits for governing the operation of the system; a relay associated with the control circuit and adapted to be energized when a circuit is established through any of the devices connected in the main distributing circuit; a starting switch energized from the source of electrical storage through said relay; a main switch; an energizing circuit for the main switch included in the control circuit; and an interlock associated with the starting switch and included in the energizing circuit of the main switch.

8. In an electrical generating system, the combination with an electrical generator; a battery; a prime mover; an electrical motor for starting the prime mover; and a main distributing circuit including current consuming devices; of a system of control for said apparatus comprising a main distributing circuit switch; an auxiliary switch for controlling the starting motor and an interlock operated by said auxiliary switch for interrupting the actuating circuit for the main switch when the auxiliary switch is open.

9. An electrical generating system comprising a generator; a prime mover adapted to drive the generator; a source of electrical storage and supply; a main distributing circuit associated therewith including current consuming devices; control circuits for governing the operation of the system; of a main circuit switch; a starting motor switch; and a coil for actuating said main circuit switch having its circuit interlocked with the starting motor switch, said coil being energized in accordance with the voltage of the main distributing circuit.

10. In an electrical generating system, the combination with an electrical generator; a battery; a prime mover; an electrical motor for starting the prime mover; and a main distributing circuit including current consuming devices; of a system of control for said apparatus comprising an auxiliary switch for controlling the starting motor, a main circuit switch interlocked with the auxiliary switch, and a relay interlocked with the main switch and energized through the current consuming devices for effecting the closing of the auxiliary switch.

11. In an electrical generating system, the combination with an electrical generator; a distributing circuit including current consuming devices; a prime mover; means for automatically controlling the operation of said prime mover in accordance with the circuits established in the distributing circuit; and a storage battery; of a switching device associated with the storage battery for automatically disconnecting the battery from the distributing circuit when the system is operating; and means for automatically connecting the storage battery to the distributing circuit during the operation of said system only when the storage battery requires recharging.

12. In an electrical generating system, the combination with an electrical generator; a distribution system including current consuming devices; a prime mover; a storage battery of materially less voltage than the voltage of the distribution system; and means for automatically controlling the operation of said prime mover in accordance with the circuits established in the distribution system; of switching mechanism associated with said storage battery and adapted to start said generating system when the battery charge decreases to a predetermined small value independently of the circuits in the distribution system, said storage battery functioning only as a means for starting said prime mover.

13. In an electrical generating system the combination with an electrical generator; a distribution system including current consuming devices; a prime mover; a storage battery of materially less voltage than the voltage of the distributing system; and means for automatically controlling the operation of said prime mover in accordance with the circuits established in the distribution system; of switching mechanism associated with said storage battery for starting said generating system when the battery charge decreases to a predetermined small value, and means for automatically interrupting the operation of the generating system when the battery becomes charged to a predetermined voltage, said storage battery functioning only as a means for starting said prime mover.

In witness whereof, I have hereunto signed my name in the presence of two subscribing witnesses.

HARRY A. HARRINGTON.

Witnesses:
L. M. HARTMAN,
B. J. McDANEL.